United States Patent [19]

Sugasawa

[11] Patent Number: 4,778,023

[45] Date of Patent: Oct. 18, 1988

[54] REAR WHEEL STEERING ANGLE CONTROL SYSTEM FOR FOUR WHEEL STEER VEHICLE

[75] Inventor: Fukashi Sugasawa, Yokohama, Japan

[73] Assignee: Nissan Motor Co., Ltd., Yokohama, Japan

[21] Appl. No.: 18,734

[22] Filed: Feb. 24, 1987

Related U.S. Application Data

[63] Continuation of Ser. No. 777,759, Sep. 19, 1985, abandoned.

[30] Foreign Application Priority Data

Sep. 20, 1984 [JP] Japan .................. 59-195666
Sep. 20, 1984 [JP] Japan .................. 59-195667

[51] Int. Cl.$^4$ .................................... B62D 5/06
[52] U.S. Cl. ........................ 180/140; 280/91
[58] Field of Search ............ 180/140, 141, 142, 143, 180/79.1, 79.3; 280/91

[56] References Cited

U.S. PATENT DOCUMENTS

| | | | |
|---|---|---|---|
| 3,633,701 | 1/1972 | Le Tourneau | 180/79.1 |
| 4,263,979 | 4/1981 | Sturgill | 180/142 |
| 4,412,594 | 11/1983 | Furukawa | 180/142 |
| 4,418,780 | 12/1983 | Ito | 180/142 |
| 4,441,572 | 4/1984 | Ito | 180/79.1 |
| 4,476,529 | 10/1984 | Nakamura | 180/142 |

FOREIGN PATENT DOCUMENTS

2352526 4/1075 Fed. Rep. of Germany .
40930 4/1978 Japan ..................... 180/140
58-97566 6/1983 Japan .

Primary Examiner—John J. Love
Assistant Examiner—Everett G. Diederiks, Jr.
Attorney, Agent, or Firm—Foley & Lardner, Schwartz, Jeffery, Schwaab, Mack, Blumenthal & Evans

[57] ABSTRACT

A rear wheel steering control system for a four wheel steerable vehicle has a controller such as a microcomputer for steering rear wheels through a hydraulic actuator. When a small turning radius is required, the controller steers the rear wheels in an opposite direction to a direction in which the front wheels are steered. The control system further has various sensors such as front wheel angle sensor, rear wheel angle sensor, vehicle speed sensor and gear position sensor for sensing a position of a transmission. From one or more of the sensor output signals, the controller determines whether the vehicle is in a predetermined condition in which the rear wheel steering action in the opposite direction should be restrained in order to prevent the rear end of the vehicle from swinging laterally in the opposite direction and bumping against an adjacent object. If it is determined that the vehicle is in the predetermined condition, the controller steers the rear wheels gradually in the opposite direction.

23 Claims, 8 Drawing Sheets

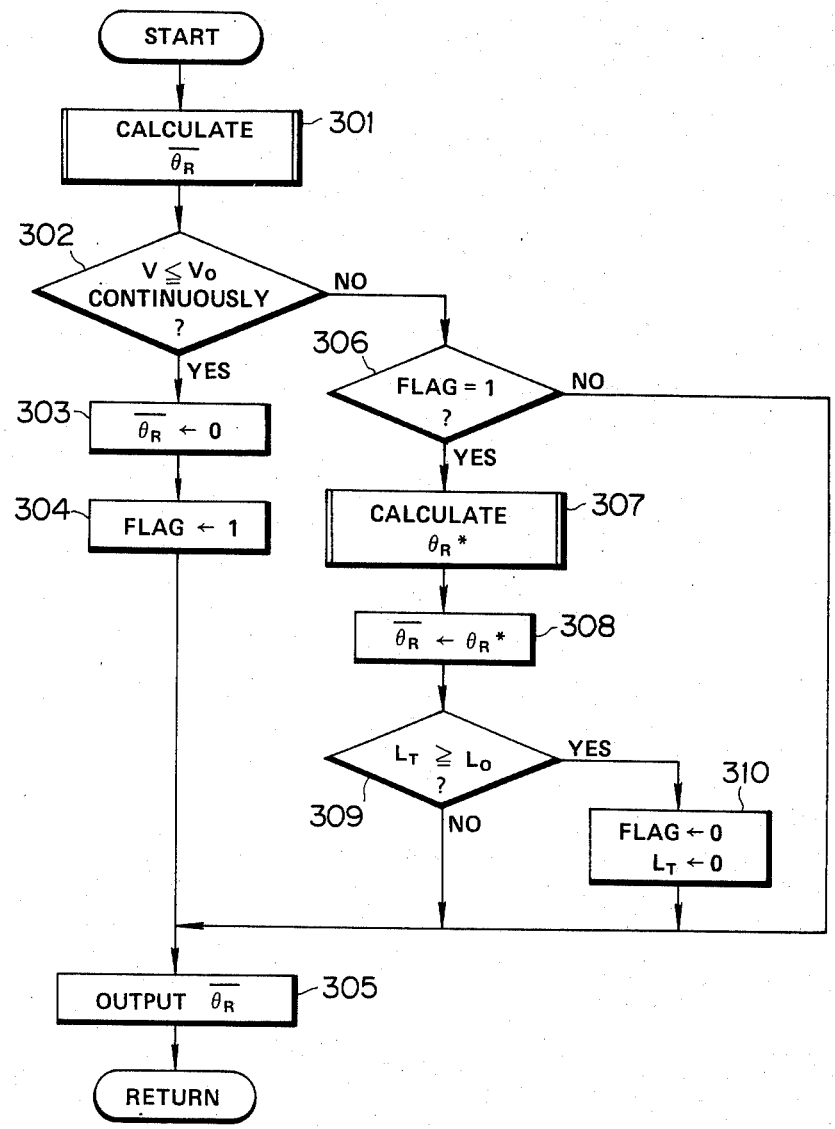

REAR WHEEL STEERING ANGLE CONTROL SYSTEM FOR FOUR WHEEL STEER VEHICLE

This application is a continuation of application Ser. No. 777,759, filed Sept. 19, 1985, now abandoned.

BACKGROUND OF THE INVENTION

1. Field of the Invention

The present invention relates to a vehicle having steerable front wheels and steerable rear wheels, and more specifically to a rear wheel steering angle control system arranged to limit a swing motion of a rear end of the vehicle in a direction opposite to a turn direction of the vehicle.

2. Description of the Prior Art

Japanese Patent provisional publication No. 58-97566 shows a conventional steering system for steering both front and rear wheels of a vehicle. When an angular displacement of a steering wheel is greater than a predetermined angle (that is, a small turning radius is required), this steering system steers the rear wheels in a direction opposite to a steering direction of the front wheels in order to reduce the turning radius. If, for example, the driver of a vehicle 30 shown in FIG. 4 starts the vehicle and simultaneously turns front wheels 19 and 20 to the right to move the vehicle in a direction shown by an arrow "A" away from a parking place adjacent to a wall 40, then the steering system of this conventional example turns rear wheels 21 and 22 to the left, and causes a rear end of the vehicle to swing in a leftward direction shown by an arrow "B". Therefore, the rear end bumps against the wall 40.

3. Description of the Related Art

A related U.S. patent application, Ser. No. 703,593, filed on Feb. 20, 1985 shows a steering system arranged to prevent such a collision of a rear end of a four wheel steer vehicle. However, this steering system tends to needlessly deteriorate the steering response of the rear wheels.

SUMMARY OF THE INVENTION

It is an object of the present invention to provide a rear wheel steering control system for a four wheel steerable vehicle, arranged to avoid the possibility of a collision of the vehicle rear end against an adjacent obstruction on a side of the vehicle opposite to the turning direction of the vehicle caused by steering the rear wheels in a direction opposite to the steering direction of the front wheels, and to minimize the possibility of an unnecessary retardation of the steering response of the rear wheels.

As shown in FIG. 1, according to the present invention, a rear wheel steering control system for a vehicle having steerable front wheels and steerable rear wheels comprises a front wheel angle sensing means 103 for sensing an actual front wheel steering angle of the front wheels, a rear wheel actuating means 104 for steering the rear wheels in a direction represented by a control signal in such an amount that an actual rear wheel steering angle of the rear wheels is made equal to a steering angle represented by the control signal, and a rear wheel control means 105 for producing the control signal to control the rear wheels. The control means is connected with the front angle sensing means, and determines a desired rear wheel steering angle in accordance with the actual front wheel angle currently sensed by the front angle sensing means. The control means has at least a first control mode in which the control means produces the control signal so that the rear wheels are steered in an opposite direction to a steering direction of the front wheels and the actual rear wheel angle is maintained equal to the desired rear wheel angle. The control means determines whether the vehicle is in a predetermined condition. The control means controls the rear wheels by modifying the control signal so that the actual rear wheel angle approaches the desired rear wheel angle gradually if the control signal is produced in the first control mode and at the same time the vehicle is in the predetermined condition.

BRIEF DESCRIPTION OF THE DRAWINGS

FIG. 7 is a flowchart of a control program used in a second embodiment of the present invention.

DETAILED DESCRIPTION OF THE INVENTION

Figure 1:
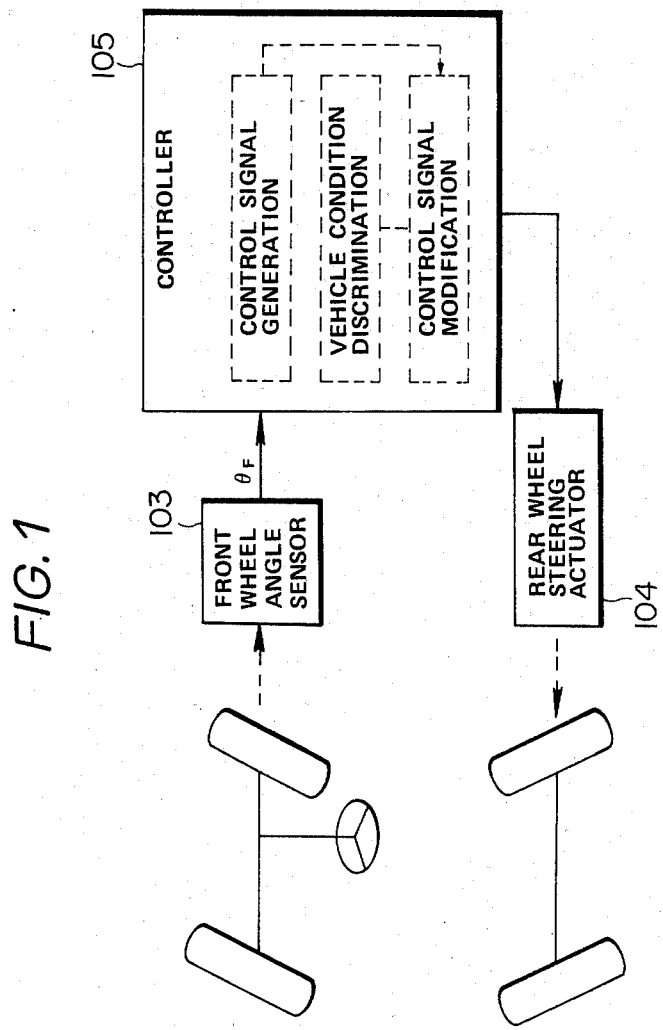
FIG. 1 is a block diagram showing a control system of the present invention.
Figure 2:
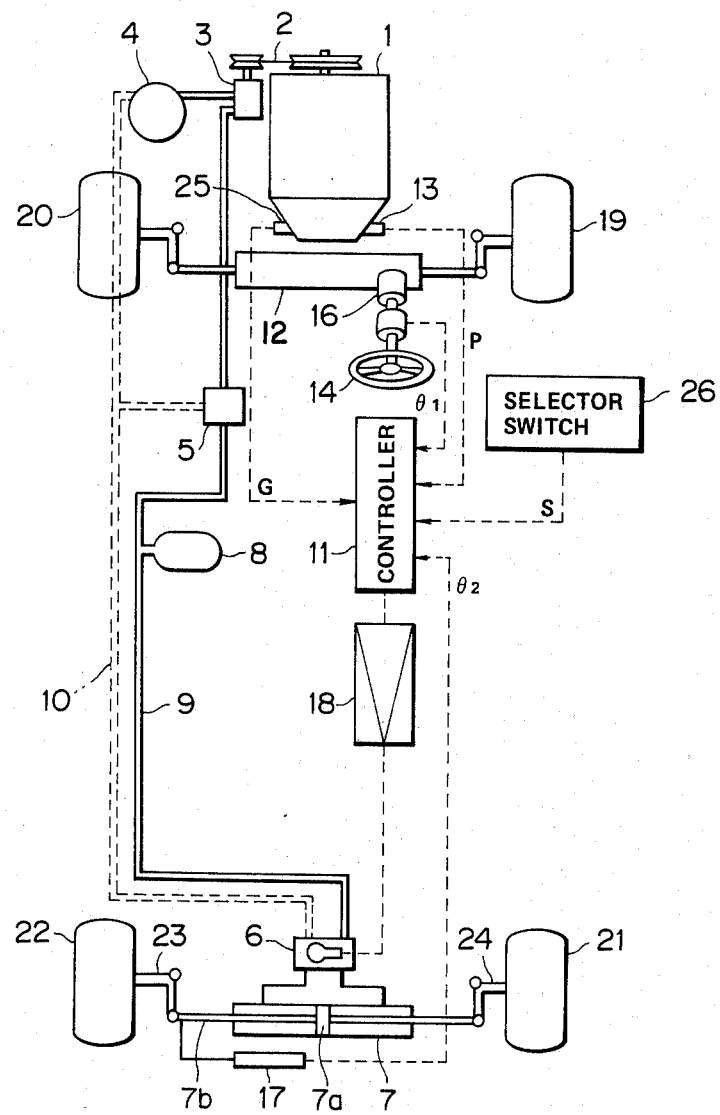
FIG. 2 is a schematic view of a vehicle equipped with the control system of one embodiment of the present invention.
Figure 3:
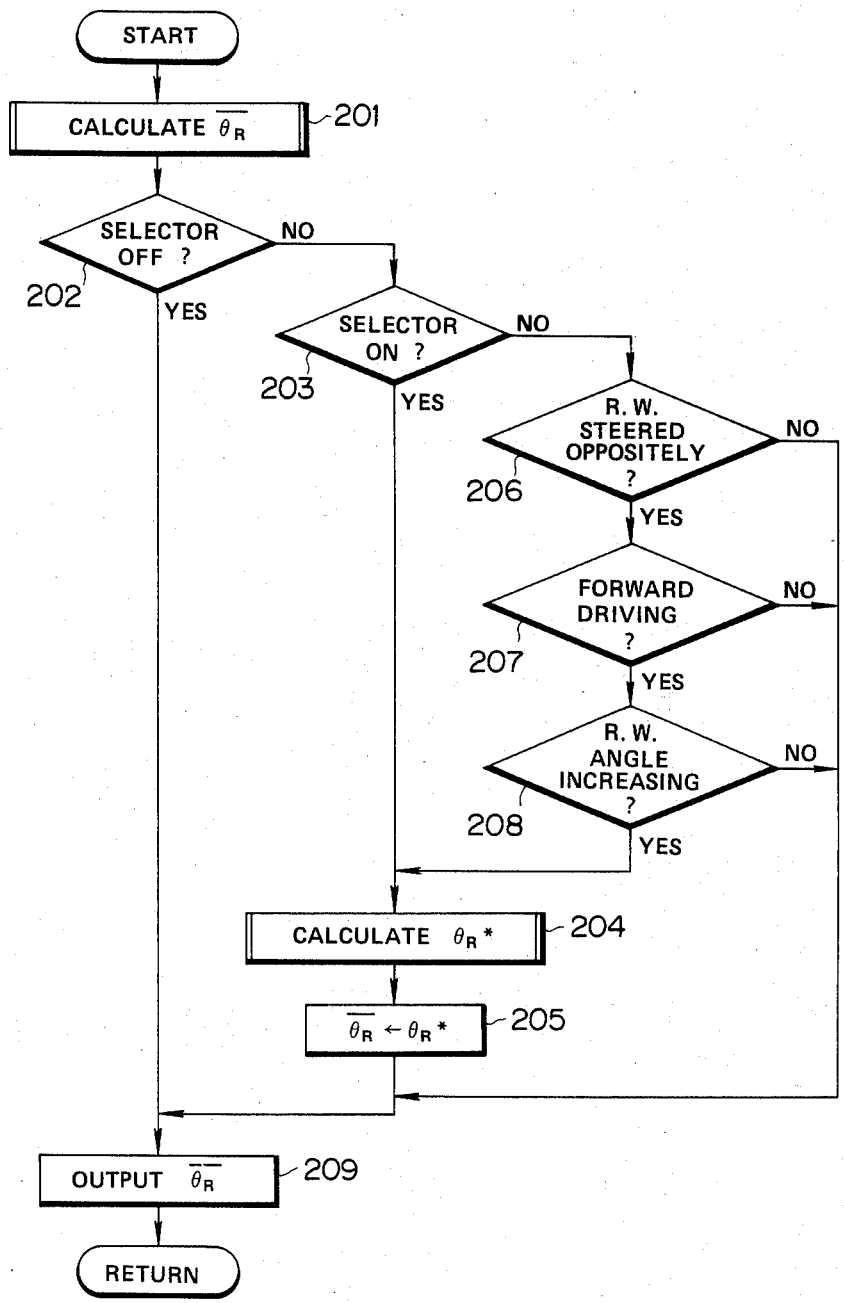
FIG. 3 is a flowchart of a control program used in a first embodiment of the present invention.

A first embodiment of the present invention is shown in FIGS. 2 and 3.

Front wheels 19 and 20 of a vehicle are steered by a front wheel steering mechanism 12 of a conventional mechanical linkage type or a type having a power steering. An actual front wheel steering angle through which the front wheels 19 and 20 are steered is proportional to an angular displacement of a steering wheel 14.

Rear wheels 21 and 22 are steered by a hydraulic actuator 7 which has a piston 7a and a piston rod 7b. Left and right ends of the piston rod 7b are connected with knuckle arms 23 and 24 of the rear wheels 22 and 21, respectively. The piston 7a is moved axially in accordance with a fluid pressure difference between left and right pressure chambers of the actuator 7.

An operating oil is supplied to the hydraulic actuator 7 from an oil pump 3 through an unloading valve 5, an accumulator 8, a supply passage 9 and a servo valve 6. The oil is returned to an oil tank 4 through a return passage 10. The oil pump 3 is driven by an engine 1 of the vehicle through a belt 2.

A controller 11 controls an actual rear wheel steering angle through which the rear wheels 21 and 22 are steered, by controlling a displacement of the piston 7a of the hydraulic actuator 7 through the servo valve 6. A servo amplifier 18 receives a control signal indicative of a desired rear wheel steering angle, produced by the controller 11, and drives the servo valve 6 in accordance with the control signal of the controller 11.

The controller 11 receives various signals from a vehicle speed sensor 13, a steering wheel angle sensor 16, a displacement sensor 17, a gear position sensor 25 and a selector switch 26.

The vehicle speed sensor 13 is provided in a transmission of the vehicle, and produces a pulse signal P whose pulse repetition frequency (rate) is proportional to a rotational speed of an output gear of the transmission.

The steering wheel angle sensor 16 may be in the form of an encoder or a potentiometer, and produces a signal $\theta_1$ proportional to a steering angle of the steering wheel 14. The signal $\theta_1$ corresponds to the actual front wheel steering angle. Therefore, the steering wheel angle sensor 16 serves as a sensor for sensing an actual front wheel steering angle.

The displacement sensor 17 produces a signal $\theta_2$ proportional to a displacement of the piston rod 7b of the hydraulic actuator 7. Therefore, the signal $\theta_2$ corresponds to the actual rear wheel steering angle. The displacement sensor 17 may be in the form of a potentiometer or an encoder.

The gear position sensor 25 detects whether the gear position of the transmission is a forward driving position.

The selector switch 26 is operated manually by the driver of the vehicle. The selector switch 26 has an off position, an on position and an automatic control position, and produces an output signal S.

FIG. 3 shows a control program of the first embodiment performed in the controller 11.

The control program is repeated at regular intervals of a predetermined time length. At a step 201, the controller 11 calculates a desired rear wheel steering angle $\overline{\theta}_R$. The controller 11 reads the steering wheel angle $\theta_1$ sensed by the steering wheel angle sensor 16. and determines the desired rear wheel angle $\overline{\theta}_R$ from the steering wheel angle $\theta_1$ which corresonds to the actual front wheel steering angle $\theta_F$ so that $\overline{\theta}_R$ is proportional to $\theta_F$. In this embodiment $\overline{\theta}_R = \theta_F$ (The steering direction of the rear wheels is opposite to the steering direction of the front wheels.).

At a step 202, the controller 11 determines whether the selector switch 26 is in its off position or not. If it is, the controller 11 proceeds to a step 209 and outputs a control signal indicative of the desired rear wheel angle $\overline{\theta}_R$ determined at the step 201 to the servo amplifier 18.

In this case, therefore. the rear wheels 21 and 22 are steered simultaneously with the front wheels 19 and 20 in such a manner that the actual rear wheel angle is equal to the actual front wheel angle $\theta_F$ but the steering direction of the rear wheels is opposite to the steering direction of the front wheels.

If the selector switch 26 is in the on position, the controller 11 proceeds from the step 202 to a step 203 for further determining whether the selector switch 26 is in the on position, and in response to an affirmative answer of the step 203, the controller 11 proceeds from the step 203 to steps 204 and 205.

At the step 204, the controller 11 determines a delayed rear wheel steering angle $\theta_R^*$. In this embodiment, the delayed rear wheel angle is determined from the actual front wheel angle $\theta_F$, an actual rear wheel steering angle $\theta_R$ obtained from the output signal $\theta_2$ of the displacement sensor 17, and the output signal P of the vehicle speed sensor 13. A travel distance L traveled by the vehicle is determined by counting the number of pulses of the signal P of the vehicle speed sensor 13. When the travel distance L reches a predetermined distance l, the controller 11 determines the delayed rear wheel angle $\theta_R^*$ by the following equation (1).

$$\theta_R^* = \theta_R + K(\overline{\theta}_R - \theta_R) \tag{1}$$

$(0 < K \leq 1)$

Each time the total travel distance is increased by l, the controller 11 updates the delayed angle $\theta_R^*$ by substituting current values of $\theta_R$ and $\overline{\theta}_R$ into the equation (1).

At the step 205, the controller 11 substitutes the thus-determined delayed rear wheel angle $\theta_R^*$ for the desired rear wheel steering angle $\overline{\theta}_R$ determined at the step 201. At the step 209, the controller 11 outputs the signal of the desired angle $\overline{\theta}_R$ which, in this case, is set equal to the delayed angle $\theta_R^*$.

Figure 5:
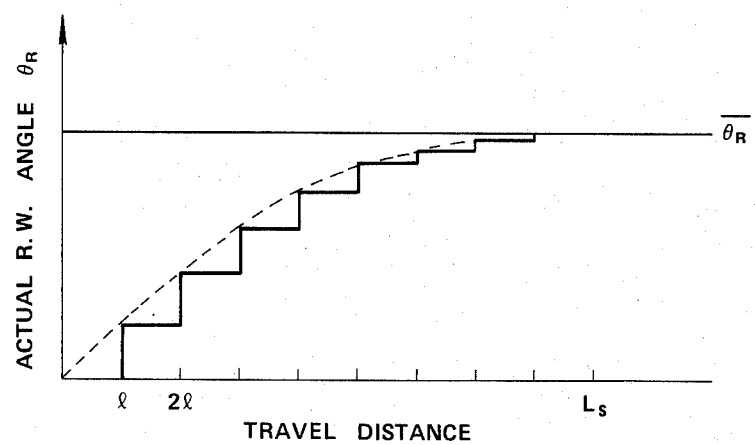
FIG. 5 is a diagram showing a relation between the actual rear wheel steering angle and a distance traveled by the vehicle, obtained by a delayed rear wheel control of the first embodiment.

While the steering wheel 14 is held in a turned position away from the straight ahead, or neutral, position and at the same time the selector switch 26 is held in the on position, the controller 11 repeats the steps 201, 202, 203, 204, 205 and 209. Therefore, the actual rear wheel steering angle $\theta_R$ approaches the desired angle $\overline{\theta}_R$ ($\overline{\theta}_R = \theta_F$) calculated at the step 201 gradually in a stepwise manner each time the vehicle travels the predetermined distance l, as shown in FIG. 5. In FIG. 5, the travel distance traveled by the vehicle until the actual rear wheel angle reaches the desired rear wheel angle is about 1 m, for example.

Figure 6:
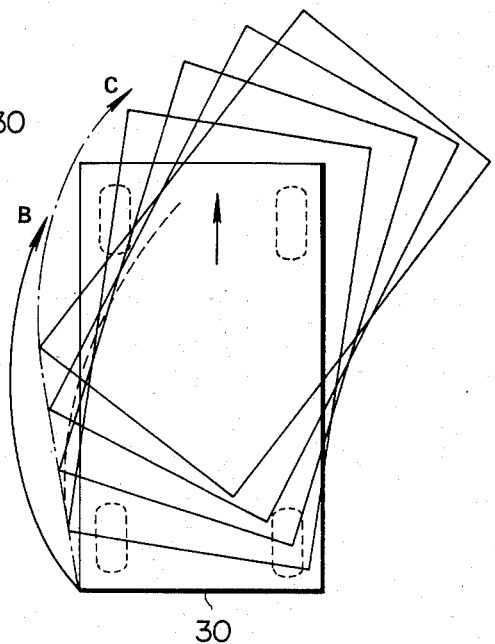
FIG. 6 is a schematic view for showing a movement of the vehicle controlled by the control system of the first embodiment.

In this way, the control system of this embodiment steers the rear wheels gradually with a delay with respect to the front wheels, and by so doing causes the outside rear end of the vehicle (that is, the left rear end in the case of the right turn of the vehicle) to move along an arc C of a one dot chain line in FIG. 6. Therefore, the vehicle can go away from the initial position safely without a lateral collision even if there is an obstruction on one side of the vehicle.

If the selector switch 26 is in the AUTO position, the controller 11 proceeds to steps 206–208 and performs the delayed rear wheel angle control of the steps 204 and 205 only when predetermined conditions are fulfilled.

At the step 206, the controller 11 first determines whether the control is in an opposite phase mode in which the rear wheels are to be steered in the direction opposite to the steering direction of the front wheels.

At the next step 207, the controller 11 determines whether the vehicle is in a forward motion. When the vehicle is steered while moving backwardly, the front of the vehicle swings outwardly and tends to bump against a wall or other obstruction. In this case, however, the driver can avoid a collision of the front of the vehicle by turning the steering wheel easily.

At the step 208 the controller 11 determines whether the rear wheel steering angle is increasing or not. If the rear wheel steering angle is increased in the direction opposite to the front wheel angle, then the possibility of a lateral collision of the rear of the vehicle increases. If, on the other hand, the rear wheel steering angle is being reduced, the possibility of collision becomes sufficiently small.

It is possible to sufficiently avoid the possibility of a collision of the rear end of the vehicle against an object lying alongside the vehicle by imposing only one or the other of the two conditions of the step 207 to check if the vehicle is moving forwardly and the step 208 to check if the rear wheel angle is in an increasing state.

The control system of this embodiment, however, imposes both of the conditions of the steps 207 and 208 in order to reduce the probability of the delayed rear wheel control of the steps 204 and 205. Therefore, the control system of this embodiment can reduce the possibility of an unnecessary retardation of the steering response of the rear wheels. When the selector switch 26 is in the AUTO position, the controller 11 performs the steps 204 and 205 only if all of the answers of the steps 206, 207 and 208 are affirmative.

The controller 11 determines whether the rear wheel control is in the opposite phase mode or not, by checking the actual front wheel angle $\theta_F$ and the actual rear wheel angle $\theta_R$, or by checking the desired rear wheel angle $\bar{\theta}_R$ determined at the step 201. The controller 11 determines whether the vehicle is in the forward driving condition or not, by checking the output signal of the gear position sensor 25. The controller 11 determines whether the rear wheel angle in the increasing condition or not, by checking a change (or time derivative) of the actual rear wheel angle $\theta_R$ (or the desired rear wheel angle $\bar{\theta}_R$) or by checking if the desired angle $\bar{\theta}_R$ determined at the step 201 is greater than the currently sensed actual rear wheel angle.

Figure 4:
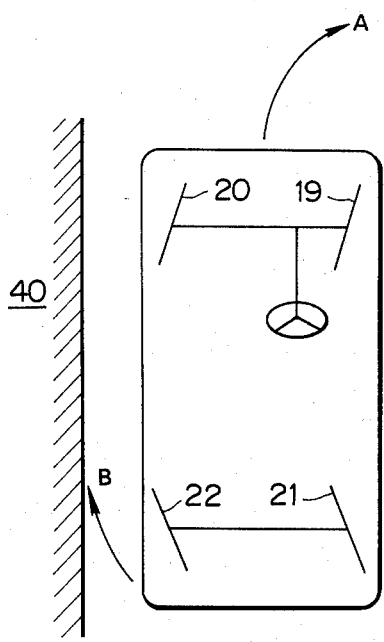
FIG. 4 is a view for showing an outward swing of a rear end of a vehicle.

In this way, the control system of this embodiment can automatically retard the steering response of the rear wheels 21 and 22 only when the rear end outward swing is undesired such as when the vehicle must go out of a parking position alongside the wall 40 by turning right or left as shown in FIG. 4. Under other circumstances, the control system of this embodiment maintains the good steering response.

In the delayed rear wheel angle control of this embodiment, the actual rear wheel angle $\theta_R$ approaches the desired rear wheel angle $\bar{\theta}_R$ gradually each time the distance traveled by the vehicle increases by a predetermined amount. However, the delayed rear wheel angle control of the step 204 may be arranged so that the actual rear wheel angle $\theta_R$ approaches the desired rear wheel angle $\bar{\theta}_R$ gradually each time a predetermined time interval elapses.

In the equation (1), the correction quantity $K(\bar{\theta}_R - \theta_R)$ added to the currently sensed actual rear wheel angle $\theta_R$ is decreased as the difference $\bar{\theta}_R - \theta_R$ decreases. However, it is optional to make the correction quantity constant. In this case, the actual rear wheel angle is increased gradually by a constant amount each time the vehicle travels the predetermined distance.

The rear wheel control system of the present invention may be arranged to determine the desired rear wheel angle so as to steer the rear wheels in the opposite direction in a low speed range and in the same direction as the front wheels in a high speed range. Furthermore, the desired rear wheel angle determined at the step 201 may be equal to a product of the actual front wheel angle and a predetermined ratio which is variable with the vehicle speed.

The U.S. patent application Ser. No. 703,593 mentioned above (which corresponds to a Japanese patent application appln. No. 59-30144 and a West German patent application No. P35 06 048.4) shows three examples of the delayed rear wheel steering control in FIGS. 3, 5 and 7. The delayed rear wheel control of the present invention may be arranged to perform one of these three examples.

A second embodiment of the present invention is shown in FIG. 7. A control system of the second embodiment has a construction which is identical to the construction of the first embodiment shown in FIG. 2. However, the control system of the second embodiment does not have the selector switch 26. A control program of the second embodiment is shown in FIG. 7.

The controller 11 of the second embodiment repeats the control program of FIG. 7 at regular time intervals.

A step 301 is similar to the step 201 of the first embodiment shown in FIG. 3. In the second embodiment too, the desired rear wheel angle $\bar{\theta}_R$ is determined as being equal to the actual front wheel angle (that is, $\bar{\theta}_R = \theta_F$).

At a step 302, the controller 11 determines whether the vehicle speed V obtained from the output signal P of the vehicle speed sensor 13 continues to be equal to or lower than a predetermined value $V_O$ (for example, $V_O$=several km/h) during a predetermined time interval (or during the time that the vehicle travels a predetermined distance).

If the answer of the step 302 is affirmative, the controller proceeds to a step 303, at which the controller 11 clears the desired rear wheel angle $\bar{\theta}_R$ determined at the step 301 to zero.

Then, the controller sets a flag to one at a step 304, and outputs the desired rear wheel angle $\bar{\theta}_R$ which is cleared at the step 303, to the servo amplifier 18 at a step 305. Therefore, in this case. the rear wheels 21 and 22 are restored to a straight ahead position.

If the answer of the step 302 is negative, the controller 11 proceeds to a step 306, at which the controller 11 determines whether the flag is equal to one or not. If the flag is one, the controller 11 performs the delayed rear wheel angle control at steps 307 and 308 similar to the steps 204 and 205 of FIG. 3.

That is, at the step 307, the controller 11 updates the value of the delayed rear wheel angle $\theta_R^*$ by substituting the current values of $\theta_R$ and $\bar{\theta}_R$ into the equation (1) each time the distance traveled by the vehicle increases by a predetermined amount, or each time a predetermined time interval elapses. At the step 308, the controller 11 replaces the value of the desired rear wheel angle $\bar{\theta}_R$ determined at the step 301 by the value of the delayed rear wheel angle $\theta_R^*$ determined at the step 307. Then at the step 305, the controller 11 outputs the desired angle $\bar{\theta}_R$ whose value is equal to the delayed angle $\theta_R^*$.

At a step 309, the controller 11 determines whether a total travel distance $L_T$ traveled by the vehicle is equal to or greater than a predetermined value $L_O$. If $L_T \geq L_O$, the controller 11 resets both of the flag and the total distance $L_T$ to zero at a step 310.

Therefore, after the flag is set at the step 304, the controller 11 repeats the steps 301, 302, and 306–309 until the total distance $L_t$ becomes equal to or greater than the predetermined value $L_O$. However, if the answer of the step 302 becomes affirmative during this, the rear wheels are returned to the straight ahead position again.

Therefore, as shown in FIG. 5, the actual rear wheel angle $\theta_R$ gradually approaches the desired rear wheel angle $\bar{\theta}_R$ determined at the step 301 (in this embodiment, $\bar{\theta}_R = \theta_F$) in a stepwise manner each time the vehicle travels the predetermined distance l (or each time the predetermined time interval elapses) as in the first embodiment.

If both answers of the steps 302 and 306 are NO, then the desired rear wheel angle $\bar{\theta}_R$ determined at the step 301 is outputted directly without being changed. In this case, the rear wheels are steered immediately without delay with respect to the front wheels in such a manner that the steering angle is equal but the steering direction is opposite.

Figure 8:
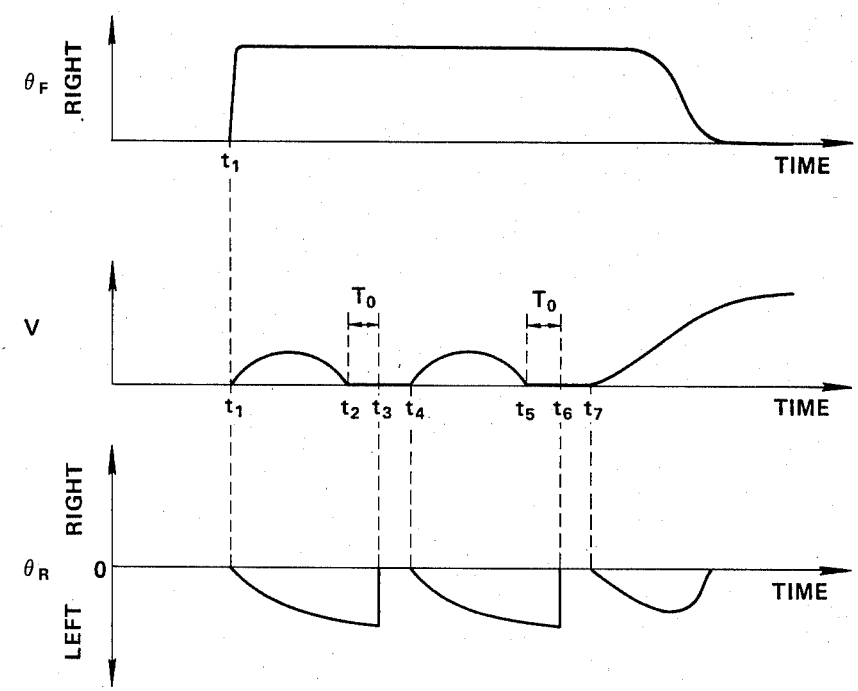
FIG. 8 is a timing chart showing changes of actual front wheel steering angle $\theta_F$, vehicle speed V and actual rear wheel steering angle $\theta_R$ when the vehicle is moved out of a parking place.

FIG. 8 shows changes of the actual rear and front wheel angles and the vehicle speed obtained by the control system of the second embodiment when the vehicle is turned to right as shown by an arrow A in FIG. 4.

In the example shown in FIG. 8. at a point $t_1$ of time, the driver starts the vehicle and at the same time turns the steering wheel through a large angle of turn to the right. Accordingly, the front wheels are turned through a large angle to the right while the vehicle speed is almost zero. The rear wheels are turned in accordance with the delayed rear wheel angle $\theta_R^*$, and the actual rear wheel angle $\theta_R$ is increased gradually in the left direction.

Then, the driver stops the vehicle at a time point $t_2$ to ascertain safety. Therefore, the vehicle continues at rest, and the vehicle speed continues in a rest or slow condition that $V \leq V_O$ from the time point $t_2$ to a time point $t_4$. A time point $t_3$ lies between the time points $t_2$ and $t_4$, and a time length between the points $t_2$ and $t_3$ is equal to the predetermined time interval $T_O$. Therefore, the rear wheels are turned to the straight ahead position at the time point $t_3$. From the time point $t_4$, the vehicle starts moving again, and the rear wheels are turned again from the straight ahead position gradually.

If the vehicle is stopped again at a time point $t_5$, the same steering actions are performed at time points $t_6$ and $t_7$.

In this way, the control system of this embodiment can prevent an undesired rear end outward swing properly and avoid the possibility of a lateral collision of the vehicle rear end against an obstruction. If, for example, the vehicle stops at an intersection and a motorcycle stops closely on the left side of the controlled vehicle, the control system of this embodiment can permit the controlled vehicle to turn to the right safely without bumping the left rear end against the motorcycle.

A counter for measuring the travel distance by counting pulses of the signal P may be arranged to start counting when the vehicle starts moving, or when the answer of the step 302 is changed to the negative answer.

Figure 9:
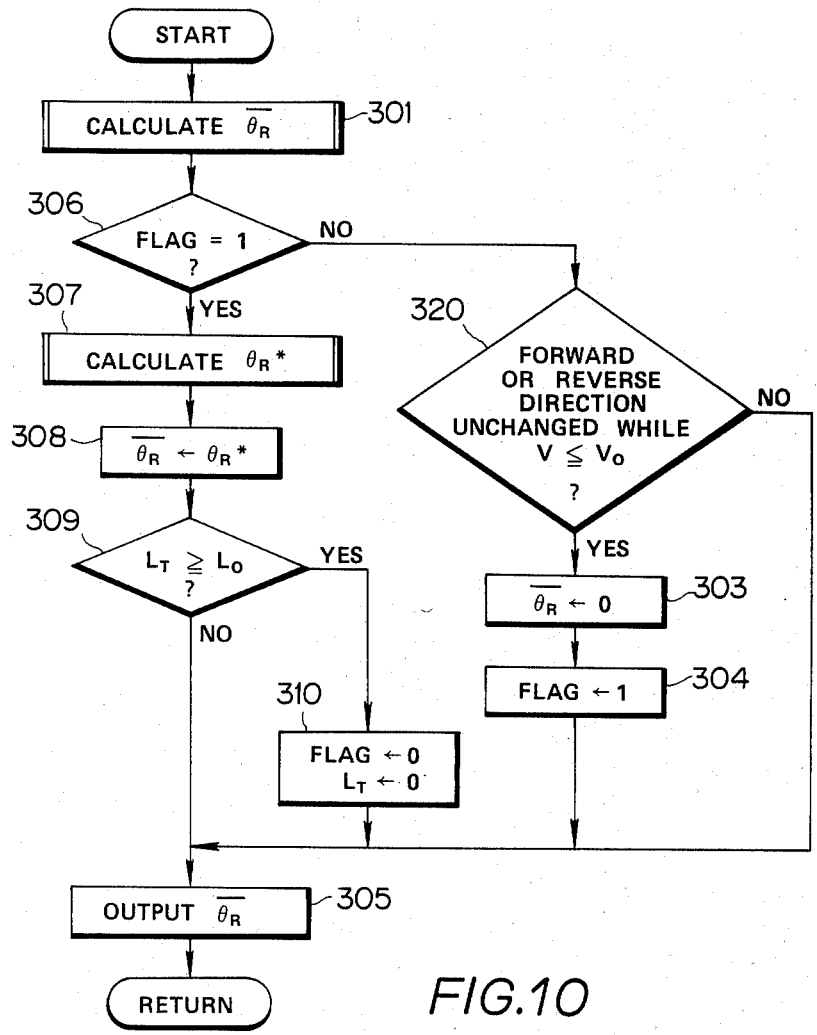
FIG. 9 is a flowchart of a control program used in a third embodiment of the present invention.

A third embodiment of the present invention is shown in FIG. 9. The steps 301, 303-310 are identical to the steps 301, and 303-310 of FIG. 7, respectively.

At a step 320, the controller 11 of the third embodiment determines whether the gear position of the transmission is maintained unchanged in the forward driving position or in the reverse position in the rest or slow condition in which the vehicle speed V is equal to or lower than the predetermined value $V_O$. If the gear position is not changed between the forward and reverse positions while $V \leq V_O$, the flag is set to one, so that the delayed rear wheel control of the step 307 is performed thereafter.

The gear position is changed between the forward and reverse positions when it is required to place the vehicle in a narrow space between other vehicles parked one behind another. In such a situation, the good steering response is preferable to the delayed rear wheel control.

The third embodiment does not employ the selector switch 26 shown in FIG. 2. However, it is optical to substitute a step 330 shown in FIG. 10 for the step 320 in FIG. 9.

It is optional to remove the step 303 to return the rear wheels to the straight ahead position from the program of FIG. 7 or the program of FIG. 9.

Figure 11:
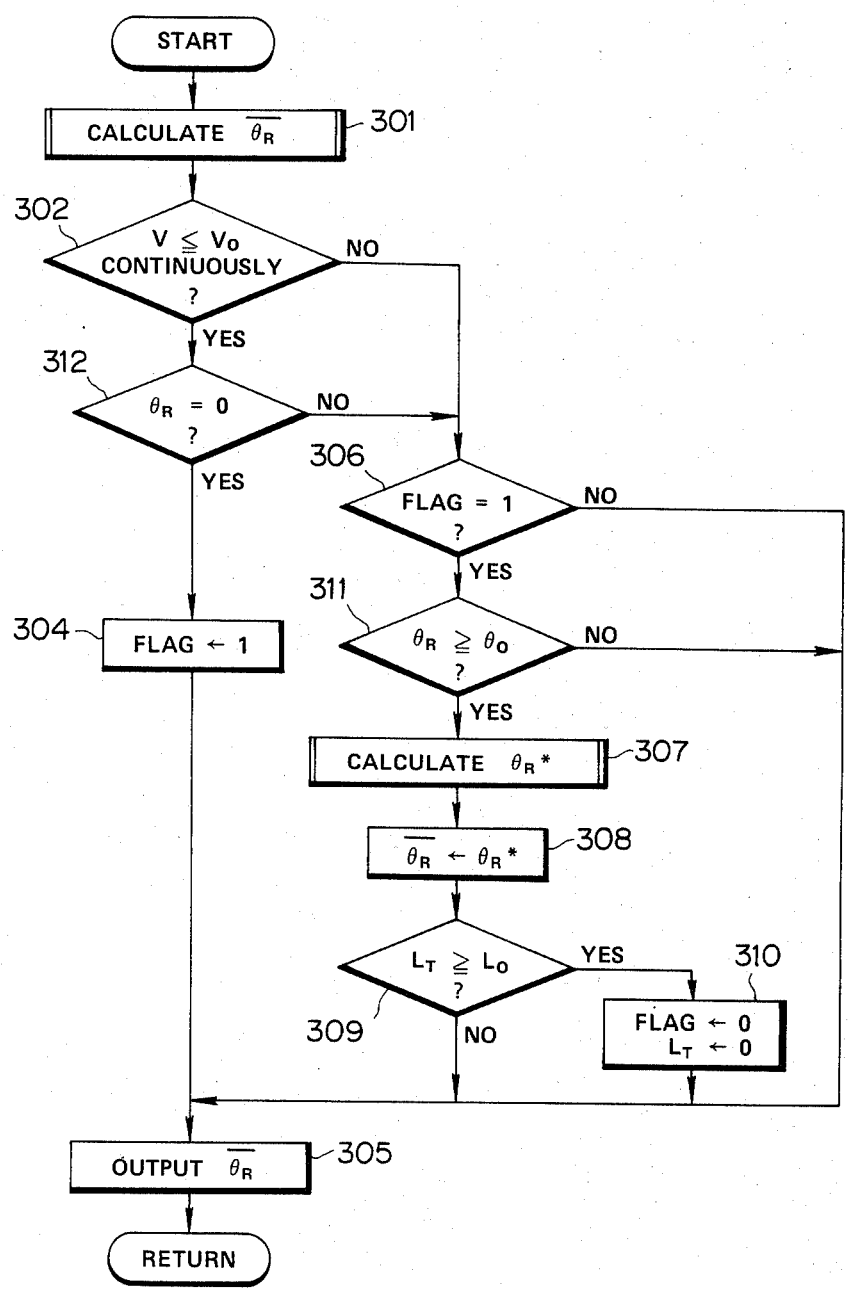
FIG. 11 is a flowchart of a control program used in a fourth embodiment of the present invention.

A fourth embodiment of the present invention is shown in FIG. 11. The control system of the fourth embodiment has a construction identical to the construction shown in FIG. 2 except that the system of the fourth embodiment does not have the selector switch 26.

In the control program of FIG. 11, the controller 11 determines whether the actual rear wheel angle $\theta_R$ is equal to or greater than a predetermined angle $\theta_O$ at a step 311. When the actual rear wheel angle $\theta_R$ is small enough, a rear end outward swing of the vehicle is not so harmful. Therefore, the control system of the fourth embodiment performs the delayed rear wheel control of the step 307 only when $\theta_R$ is equal to or greater than $\theta_O$.

In the fourth embodiment, the controller 11 further determines whether the actual rear wheel angle $\theta_R$ is equal to zero, at a step 312. In most cases, vehicles are parked with front and rear wheels in the straight ahead position. If the front and rear wheels remain in turned positions occupied when the vehicle was maneuvered into the parking place, it is considered that the vehicle can go out of this parking place safety with the front and rear wheels held in these turned positions, and accordingly the delayed rear wheel control is unnecessary. In view of this, the step 312 requires the controller to determine whether the vehicle is started in the state in which the rear wheel angle $\theta_R$ is equal to zero. It is optional to substitutes the actual front wheel angle $\theta_F$ for the rear wheel angle $\theta_R$ in the step 312. In this case, the controller determines at the step 312 whether $\theta_F$ is equal to zero.

Figure 10:
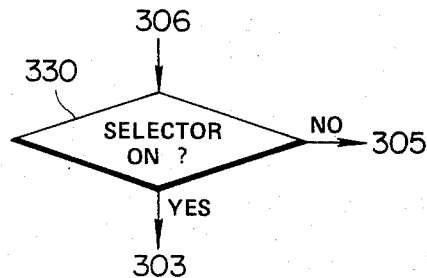
FIG. 10 is a view for showing a modification of the program of FIG. 9.

It is optional to remove the step 302 from the program of FIG. 11 and to insert the step 320 of FIG. 9 or step 330 of FIG. 10 into the program of FIG. 11 in place of the step 302.

The rear wheel steering control system of the present invention may be arranged to determine the necessity of the delayed rear wheel control by detecting obstructions with an ultrasonic sensor system which transmits ultrasonic waves and receives waves reflected back from an obstruction. In this case, the controller commands the delayed rear wheel control, such as the steps 204 and 205 and the step 303, if the ultrasonic sensor system detects an objection within a predetermined range.

What is claimed is:

1. A rear wheel steering control system for a vehicle having steerable front wheels and steerable rear wheels, comprising:
    front wheel angle sensing means for sensing an actual front wheel steering angle of said front wheels and producing a first signal representing said actual front wheel steering angle,
    distance measuring means for measuring a vehicle speed and a travel distance traveled by said vehicle and producing a second signal representing said travel distance, a gear position sensor for sensing a gear position of a transmission of said vehicle and producing a third signal only when said transmission is in a forward driving position for driving said vehicle forwardly, rear wheel actuating means for steering said rear wheels in a direction represented by a control signal, in such an amount that an actual rear wheel steering angle of said rear wheels is made equal to a steering angle represented by said control signal, and rear wheel control means for steering said rear wheels by sending said control signal to said rear wheel actuating means, said control means comprising control signal producing means responsive to said first signal for determining a desired rear wheel steering angle in accordance with said actual front wheel steering angle currently sensed by said front wheel angle sensing means and for steering said rear wheels by producing said control signal representing said desired rear wheel steering angle in a normal mode such that the steering angle represented by said control signal is immediately made equal to said desired rear wheel steering angle, condition discriminating means responsive to said third signal for producing a condition signal which is in an on state if said third signal is present, and in an off state if said third signal is absent, and control signal modifying means responsive to said second signal and said condition signal for steering said rear wheels in a direction opposite to the steering direction of said front wheels by modifying said control signal in a delayed mode such that the steering angle represented by said control signal increases gradually to said desired rear wheel steering angle in dependence on said travel distance if said condition signal is in said on state.

2. a system according to claim 1, wherein said system further comprises a rear wheel angle sensor for sensing said actual rear wheel steering angle of said rear wheels, and wherein, each time said travel distance increases by a predetermined amount, said control signal modifying means increases the steering angle represented by said control signal to a value equal to a sum of said actual rear wheel steering angle sensed by said rear wheel angle sensor and a product obtained by multiplying a difference resulting from subtraction of said actual rear wheel steering angle from said desired rear wheel steering angle determined by said control signal producing means by a predetermined coefficient which is greater than zero and equal to or smaller than one if said condition signal is in said on state.

3. A system according to claim 1, wherein said system further comprises a manually operable selector switch having an on position, an off position and an automatic control position, and wherein said selector switch allows said condition discriminating means to change said condition signal between said on state and an off state only when said selector switch is in said automatic position, said fixes said condition signal unconditionally in said on state when said selector switch is in said on position and in said off state when said selector switch is in said off position, and said control signal modifying means allows said control signal to be output without modification if said condition signal is in said off state.

4. A system according to claim 3, wherein said condition discriminating means holds said condition signal in said off state if said system is in a condition for decreasing said actual rear wheel steering angle.

5. A system according to claim 4, wherein said system further comprises a rear wheel angle sensor for sensing said actual rear wheel steering angle of said rear wheels, and wherein said discriminating means holds said condition signal in said off state if said desired rear wheel steering angle is smaller than said actual rear wheel steering angle.

6. A system according to claim 2, wherein said discriminating means holds said condition signal in said on state if said desired rear wheel steering angle is increasing.

7. A system according to claim 4 further comprises a rear wheel angle sensor for sensing said actual rear wheel steering angle of said rear wheels, and wherein said discriminating means holds said condition signal in said on state if said actual rear wheel angle is increasing.

8. A system according to claim 1, wherein said condition discriminating means holds said condition signal in said off state if said system is in a condition for decreasing said actual rear wheel steering angle.

9. A rear wheel steering control system for a vehicle having steerable front wheels and steerable rear wheels, comprising:

front wheel angle sensing means for sensing an actual front wheel steering angle of said front wheels and producing a first signal representing said actual front wheel angle, distance measuring means for measuring a vehicle speed and a travel distance traveled by said vehicle and producing a second signal representing said travel distance, a manually operable selector switch having an on position and an off position, rear wheel actuating means for steering said rear wheels in a direction represented by a control signal, in such an amount that an actual rear wheel steering angle of said rear wheels is made equal to a steering angle represented by said control signal, and rear wheel control means for steering said rear wheels by sending said control signal to said rear wheel actuating means, said control means comprising control signal producing means responsive to said first signal for determining a desired rear wheel angle in accordance with said actual front wheel angle currently sensed by said front wheel angle sensing means and for steering said rear wheels by producing said control signal representing said desired rear wheel steering angle in a normal mode such that the steering angle represented by said control signal is immediately made equal to said desired rear wheel steering angle, condition discriminating means responsive to said selector switch for producing a condition siganl which is in an on state when said selector switch is in said on position and in an off state when said selector switch is in said off position, and control signal modifying means responsive to said second signal and said condition signal for steering said rear wheels in a direction opposite to the steering direction of said front wheels by modifying said control signal in a delayed mode such that the steering angle represented by said control signal increases gradually to said desired rear wheel angle in dependence on said travel distance if said condition signal is in said on state, and allowing said normal mode if said condition signal is in said off state.

10. A system according to claim 9, wherein said selector switch further has an automatic control position, and said condition discriminating means holds said condition signal in said on state if said system is in a condition for increasing said actual rear wheel angle, and at the same time said selector switch is in said automatic position, and in said off state if said system is out of said condition for increasing said actual rear wheel angle and at the same time said selector switch is in said automatic position.

11. A system according to claim 9, wherein said system further comprises a rear wheel angle sensor for sensing said actual rear wheel steering angle of said rear wheels, and wherein, each time said travel distance increases by a predetermined amount, said control signal modifying means increases the steering angle represented by said control signal to a value equal to a sum of said actual rear wheel steering angle sensed by said rear wheel angle sensor and a product obtained by multplying a difference resulting from subtraction of said actual rear wheel steering angle from said desired rear wheel steering angle determined by said control signal producing means by a predetermined coefficient which is greater than zero and equal to or smaller than one if said condition signal is in said on state.

12. A rear wheel steering control system for a vehicle having steerable front wheels and steerable rear wheels, comprising:
  front wheel angle sensing means for sensing an actual front wheel steering angle of said front wheels and producing a first signal representing said actual front wheel angle,
  distance measuring means for measuring a vehicle speed and a travel distance traveled by said vehicle and producing a second signal representing said travel distance, said distance measuring means further producing a third signal representing a vehicle speed of said vehicle,
  rear wheel actuating means for steering said rear wheels in a direction represented by a control signal, in such an amount that an actual rear wheel steering angle of said rear wheels is made equal to a steering angle represented by said control signal, and
  rear wheel control means for steering said rear wheels by sending said control signal to said rear wheel actuating means, said control means comprising control signal producing means responsive to said first signal for determining a desired rear wheel steering angle in accordance with said actual front wheel steering angle currently sensed by said front wheel angle sensing means and for steering said rear wheels by producing said control signal representing said desired rear wheel steering angle in a normal mode such that the steering angle represented by said control signal is immediately made equal to said desired rear wheel steering angle, condition discriminating means responsive to said third signal for producing a condition signal which is normally in an off state, and in an on state if said vehicle speed continues equal to or lower than a predetermined speed for a predetermined time interval, and control signal modifying means responsive to said second signal and said condition signal for steering said rear wheels in a direction opposite to the steering direction of said front wheels in a delayed mode such that the steering angle represented by said control signal increases gradually to said desired rear wheel angle in dependence on said travel distance if said condition signal is in said on state.

13. A system according to claim 12, wherein said system further comprises a rear wheel angle sensor for sensing said actual rear wheel steering angle of said rear wheels, and wherein, each time said travel distance increases by a predetermined amount, said control signal modifying means increases the steering angle represented by said control signal to a value equal to a sum of said actual rear wheel steering angle sensed by said rear wheel angle sensor and a product obtained by multiplying a difference resulting from subtraction of said actual rear wheel steering angle from said desired rear wheel steering angle determined by said control signal producing means by a predetermined coefficient which is greater than zero and equal to or smaller than one if said condition signal is in said on state.

14. A system according to claim 13, wherein said condition discriminating means changes said condition signal to an off state if said travel distance becomes equal to or greater than a predetermined total distance.

15. A system according to claim 12, wherein said control signal modifying means modifies said control signal so that said rear wheels are steered to a straight ahead position if said vehicle speed continues equal to or lower than said predetermined speed.

16. A system according to claim 12, wherein said system further comprises a rear wheel angle sensor for sensing said actual rear wheel steering angle of said rear wheels, and said condition discriminating means sets said condition signal to said on state if said if said vehicle speed continues equal to or lower than said predetermined value for said predetermined time interval and at the same item said actual rear wheel angle is equal to zero.

17. A system according to claim 16, wherein said control signal modifying means modifies said control signal only if said actual rear wheel steering angle is equal to or greater than a predetermined angle.

18. A system according to claim 12, wherein said system further comprises a gear position sensor for sensing forward and reverse driving positions of a transmission of said vehicle, and wherein said condition discriminating means sets said condition signal to said on state if the position of said transmission is not changed between said forward and reverse driving positions while said vehicle speed is equal to or lower than said predetermined speed.

19. A rear wheel steering control system having steerable front wheels and steerable rear wheels, comprising;
  front wheel angle sensing means for sensing an actual front wheel steering angle of said front wheels and producing a first signal representing said actual front wheel steering angle,
  distance measuring means for measuring a vehicle speed and a travel distance travelled by said vehicle and producing a second signal representing said travel distance,
  rear wheel actuating means for steering said rear wheels in a direction represented by a control signal, in such an amount that an actual rear wheel steering angle of said rear wheels is made equal to a steering angle represented by said control signal, and rear wheel control means for steering said rear wheels by sending said control signal to said rear wheel actuating means, said control means comprising control signal producing means responsive to said first signal for determining a desired rear wheel steering angle in accordance with said actual front wheel steering angle currently sensed by said front wheel angle sensing means and for steering said rear wheels by producing said control signal representing said desired rear wheel steering angle in a normal mode such that the steering angle represented by said control signal is immediately made equal to said desired rear wheel angle, condition discriminating means for producing a condition signal which is normally in an off state, and in an on state if said system is in a condition for increasing said actual rear wheel steer angle, and control signal modifying means responsive to said second signal and said condition signal for steering said rear wheels in a direction opposite to the steering direction of said front wheels by modifying said control signal in a delayed mode such that the steering angle represented by said control signal increases gradually to said desired rear wheel steering angle independence on said travel distance if said condition signal is in said on state.

20. A system according to claim 19, wherein said system further comprises a rear wheel angle sensor for sensing said actual rear wheel steering angle of said rear wheels, and wherein, search time said travel distance increases by a predetermined amount, said control signal modifying means increases the steering angle represented by said control signal to a value equal to a sum of said actual rear wheel steering angle sensed by said rear wheel angle sensor and a product obtained by multiplying a difference resulting from subtraction of said actual rear wheel steering angle from said desired rear wheel steering angle determined by said control signal producing means by a predetermined coefficient which is greater than zero and equal to or smaller than one if said condition signal is in said on state.

21. A system according to claim 20, wherein said condition discriminating means monitors variation of said actual rear wheel steer angle sensed by said rear wheel steer angle sensor to determine whether said system is in said condition for increasing said actual rear wheel steer angle.

22. A system according to claim 20, wherein said condition discriminating means monitors variation of said desired rear wheel steer angle to determine whether said system is in said condition for increasing said actual rear wheel steer angle.

23. A system according to claim 20, wherein said condition disriminating means sets said condition signal to said on state if said desired rear wheel steer angle is greater than said actual rear wheel steer angle sensed by said rear wheel steer angle sensor.

* * * * *